United States Patent [19]
Lyons

[11] Patent Number: 5,644,819
[45] Date of Patent: Jul. 8, 1997

[54] REUSABLE METALLIC BANDING ASSEMBLY

[75] Inventor: John Lyons, Levitown, N.Y.

[73] Assignee: Duro Dyne Corporation, Farmingdale, N.Y.

[21] Appl. No.: 715,351

[22] Filed: Aug. 30, 1996

[51] Int. Cl.[6] .................................... B65D 63/00
[52] U.S. Cl. ................. 24/20 R; 24/16 PB; 24/20 EE; 24/23 EE
[58] Field of Search ................. 24/20 R, 20 EE, 24/23 EE, 21, 16 PB

[56] References Cited

U.S. PATENT DOCUMENTS

| | | | |
|---|---|---|---|
| 3,311,957 | 4/1967 | Dunn | 24/21 |
| 3,542,321 | 11/1970 | Kahabka | 24/16 PB |
| 3,855,669 | 12/1974 | Meyer | 24/16 PB |
| 4,541,146 | 9/1985 | Giannone | 24/20 R |
| 5,224,244 | 7/1993 | Ikeda et al. | 24/16 PB |

*Primary Examiner*—Victor N. Sakran
*Attorney, Agent, or Firm*—Mark T. Basseches, Esq.; Reid & Priest LLP

[57] ABSTRACT

A banding device is formed of two metallic components, namely, a clamp component and a strap component. The clamp and strap components are slidably assemblable into interlocked engagement. The strap includes regularly longitudinally spaced locking components, the locking components including teeth deflected from the plane of the strap and locking shoulders in the plane of the strap. The strap is applied by advancing the free end through a passage formed in the clamp, a pawl of the clamp being resiliently biased into the passage. The teeth and pawl co-act to permit movement of the strap through the clamp in a first direction, the pawl biasing the stop shoulders into the path of a barb extending into the passage to block reverse movement of the strap. The pawl is manually accessible, enabling the spacing between the pawl and barb to be increased to thereby release the strap permitting retraction of the strap from the clamp.

4 Claims, 3 Drawing Sheets

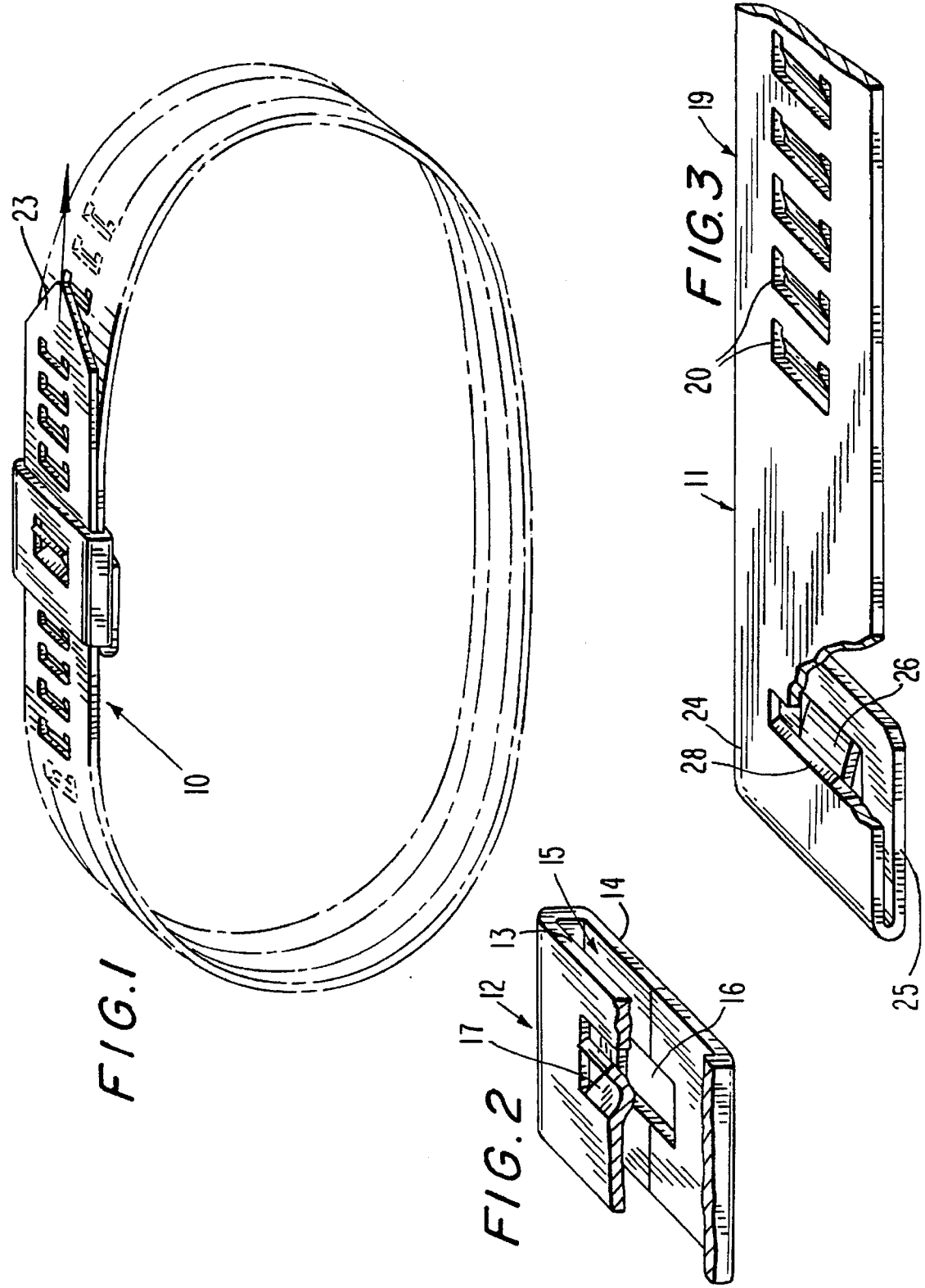

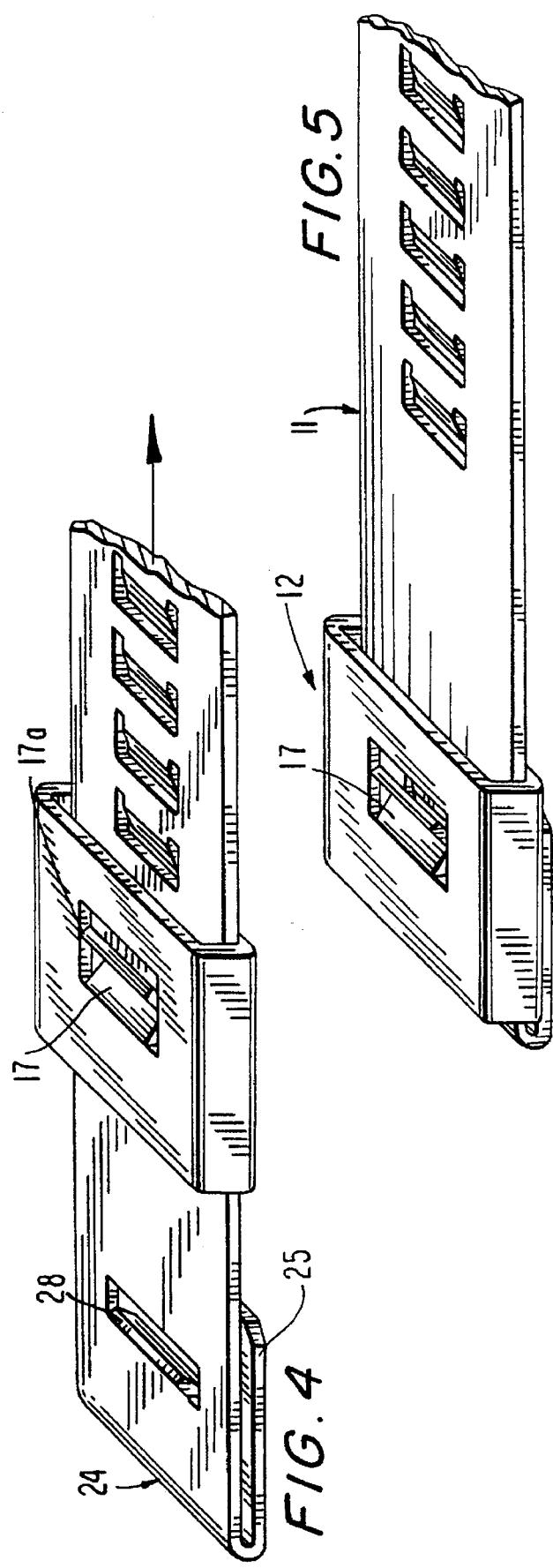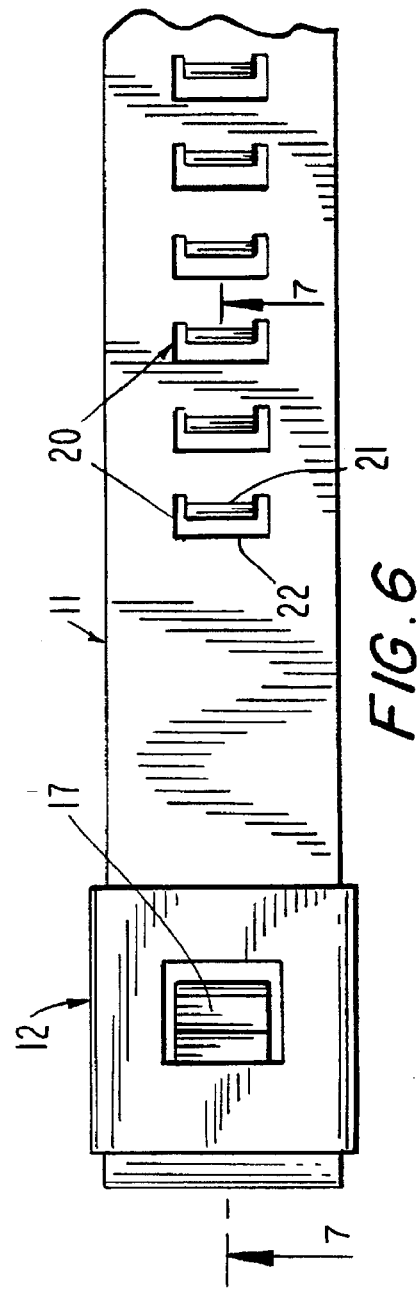

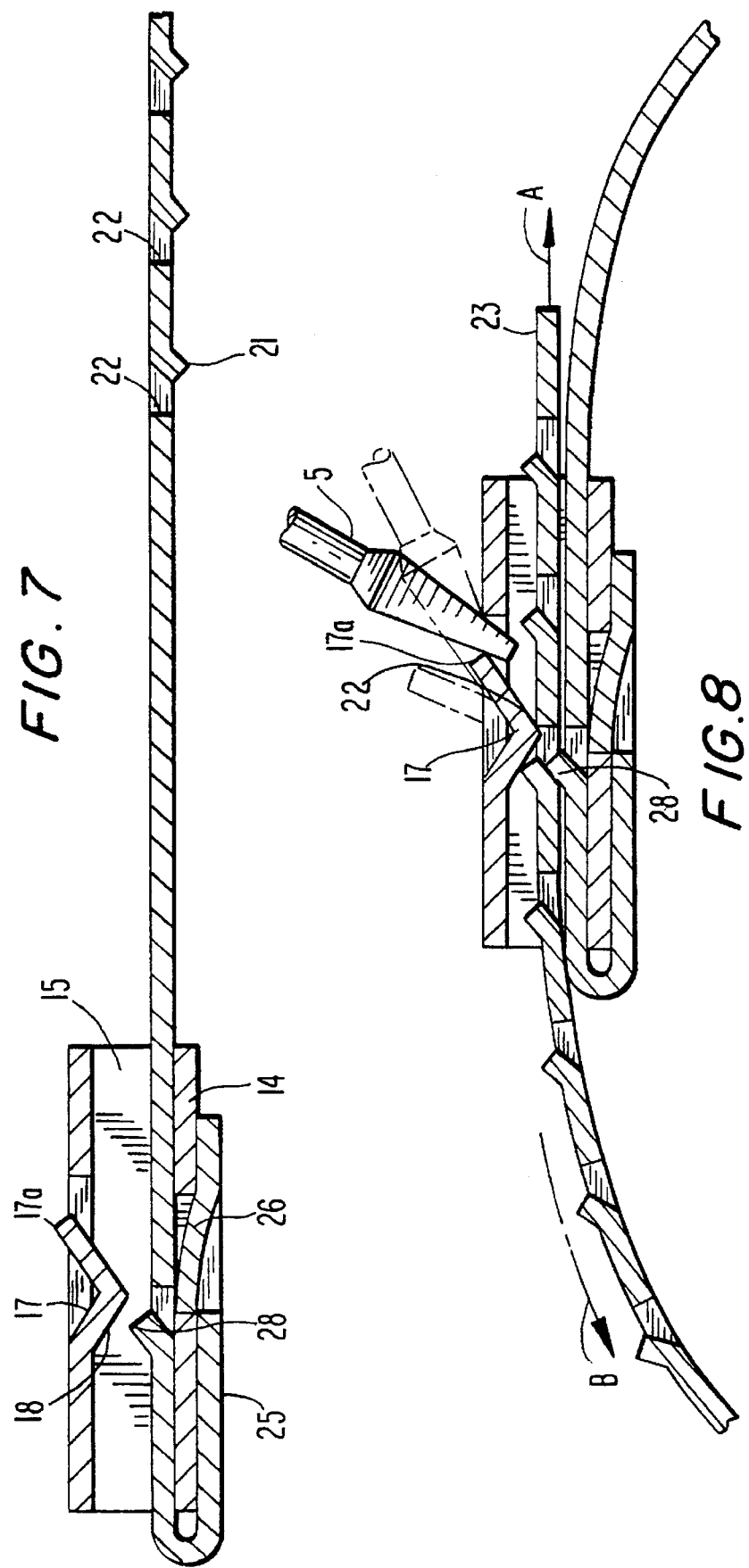

REUSABLE METALLIC BANDING ASSEMBLY

BACKGROUND OF THE INVENTION

This invention relates to a banding device and more particularly, to a metallic band assembly, intended, by way of example, and without limitation, to clamp a tubular fabric sleeve about a duct. Other uses of the device include banding articles together, etc.

PRIOR ART

Reference is made to U.S. Pat. No. 4,541,146, owned by the assignee of the instant invention, wherein there is disclosed a metallic band assembly intended to serve essentially the same purposes as set forth above, as an annular clamp, and as a bundling device.

The above referenced patent is comprised of a metal band having a convoluted clamp assembly formed integrally of the band. In use, a free end of the band is passed through the convoluted clamp assembly as the band is tightened to frictionally clamp the band in the anchoring clamp. The band is locked in position by folding the increments of the free end backwardly over the clamp.

While the band of the above referenced patent has been commercially successful, it has a shortcoming in that it is difficult or impossible to reuse the band, i.e., to remove the band from one clamping environment and refit it to a second clamping environment.

Other known clamping devices of polymeric material are illustrated in U.S. Pat. Nos. 3,660,869 of May 9, 1972, and 4,009,509 of Mar. 1, 1977. The devices of the last-mentioned patents are formed of polymeric materials such as nylon and include teeth projecting from a surface of the band which function in a ratchet-like manner to engage with a resilient locking pawl extending into a restricted passage such that the teeth and clamp co-act in such manner as to permit passage of the strap in a first direction while blocking return movements of the strap.

Other known clamping devices such as hose clamps are applied by passing a metallic band having through-going apertures over a worm gear, the clamp being tightened by rotating the worm which is meshed with the through-going apertures.

The described clamps suffer one or more inadequacies, and particularly, are not subject to rapid application and ready release from the applied condition. For instance, the nylon-type straps are intended to be removed by cutting through the strap, an action which renders the strap useless and further requires a cutting tool to be inserted between the strap and the encircled article or articles with resultant scarring of the encircled items.

The threaded hose-type clamp described above, while removable and reusable, is disadvantageous in that cinching and releasing the clamp is a time consuming operation requiring rotating a threaded worm. Also, the worm assembly is relatively costly and necessarily projects a significant distance from the surface of the strap or band, a disadvantage where clearance spaces are limited.

SUMMARY OF THE INVENTION

The present invention may be summarized as directed to a new, useful, inexpensive strapping or banding device constructed entirely from stamped metal components. The device has a low profile facilitating its use where space limitations exist. The band may be rapidly applied, and importantly, may be rapidly released and reused.

More particularly, the band device of the present invention comprises a two-part assembly, namely, a clamp component and a band member. Each of these components is fabricated from stamped sheet metal, the components being assembled by a simple sleeving action.

The band includes a multiplicity of longitudinally spaced teeth struck from and projecting beyond the plane of the band, the teeth being formed adjacent locking apertures in the band.

The clamp component includes a through-going passage through which the band may be passed with minimal clearances. The clamp includes a pawl resiliently projected into the passage, the pawl including a lead cam surface adapted to co-act with the teeth as the band is passed through the clamp to deflect the pawl into opening condition of the passage. The clamp includes a barb in opposed relation to the pawl, the pawl and barb functioning, when the band is tightened, to engage within the openings adjacent the teeth to lock the band against retractile movement from the clamp.

Importantly, the applied banding device may be readily removed for reuse by simply manually, or through the use of a tool, lifting the pawl clear of the passage whereby clearance is provided for retraction of the band.

Accordingly, it is an object of the invention to provide an inexpensive and effective clamping device formed of two simple stamped metal components which may be readily assembled to form the band device.

A still further object of the invention is the provision of a banding device of the type described, which may be readily applied and released for subsequent reuse.

A still further object of the invention is the provision of a banding device having a low profile.

BRIEF DESCRIPTION OF THE DRAWINGS

FIG. 1 comprises a perspective view partly in phantom of a banding assembly in accordance with the invention in the applied or encircling position.

FIG. 2 is an enlarged perspective view of the clamp component of the assembly with parts broken away to show details of construction.

FIG. 3 is a fragmentary perspective view of the band component of the assembly with parts broken away to show details of construction.

FIGS. 4 and 5 are perspective views, respectively, of the partially assembled and fully assembled clamp and band components of the device.

FIG. 6 is a fragmentary top plan view of the banding assembly.

FIG. 7 is a Sectional view taken on the line 7—7 of FIG. 6.

FIG. 8 is a sectional view through the band assembly in the mounted or article-encircling condition thereof.

DETAILED DESCRIPTION

Referring now to the drawings, there is shown in FIG. 1 a band 10 in accordance with the invention, depicted in the applied, or article-encircling, condition thereof. The band, which is preferably fabricated of a malleable metal such as galvanized iron, is comprised of two components, namely, a strap component 11 (FIG. 3) and a complemental clamp component 12 (FIG. 2). As is apparent, the strap and clamp components (11, 12) may be made of simple stampings.

The clamp component 12 comprises an upper wall 13 and a lower wall 14, the walls defining therebetween a throughgoing passage 15. The lower wall 14 includes a throughgoing aperture 16 which, as will be explained hereinafter, provides a means for connecting the clamp 12 to the strap 11.

The upper wall 13 includes a pawl member 17 which is struck from the material of the upper wall. The pawl projects into a passage 15 and includes a cam surface 18 at the lead edge thereof (see FIG. 7).

The strap member 11 comprises an elongate strap portion 19, the strap portion having formed therein a plurality of locking components 20 in longitudinally spaced relation along the length of the strap. The locking components include teeth 21 struck from the metal of the strap, the teeth being deflected from the plane of the strap. The locking components further include stop shoulder portions 22 in spaced relation to teeth 21.

The strap 11 comprises a free end 23 and a clamp receiving end 24. The receiving end 24 includes a connector leg 25 in parallel spaced relation to the plane of the strap. The leg 25 is formed with a tang 26 struck from the body of the leg (FIG. 7).

Referring to FIGS. 4 and 5, the strap component 11 is connected to the clamp component 12 by passing the free end 23 of the strap through passage 15 formed in the clamp component and relatively moving the strap through the passage in the direction of the arrow (FIG. 4). As will be best appreciated from FIGS. 5 and 7, continued movement of the strap through passage 15 will result in the tang 26 of the strap passing through locking aperture 16 formed in wall 14 of the clamp. The clamp component 12 is thus fixedly secured to the end 24 of the strap without the necessity of welding, riveting, or other connection mechanisms.

Referring particularly to FIGS. 7 and 8, it will be seen that the end 24 of the strap component 11 includes an upwardly directed barb 28 which is disposed within passage 15 in proximate spaced relation to the cam component 18 of pawl 17. Referring now to FIG. 8, the free end 23 of the strap is depicted as extending through the passage 15 in the direction of the arrow A. It will be appreciated that as the strap moves through the passage the teeth 21 sequentially engage the cam portion 18 of pawl 17, deflecting the pawl outwardly of the passage and permitting the unhindered movement of the strap through the passage. It will further be appreciated that the pawl 17 will resiliently deflect the strap downwardly toward the wall 14 whereby the stop shoulders 22 are shifted into the path of locking barb 28. The band assembly, which is now in the encircling position shown in FIG. 1, is now locked against retractile movement in the direction of the arrow B (FIG. 8).

An important feature of the invention resides in the ability to readily release the clamp assembly from its locking or banding condition without cutting the band. Further, economies are achieved by enabling the removed band to be readily reused.

Referring to FIG. 7 by way of example, the locked band assembly is released by manually, or through the use of a screwdriver S or like tool, lifting the pawl 17 from the solid line position shown in FIG. 8 to the dot-and-dash position. Preferably, the pawl includes a gripper portion 17a which extends above the clamp to facilitate lifting. As is readily apparent, by clearing the pawl from passage 15, the strap may be readily withdrawn in the direction of the arrow B.

The removed band assembly may be readily reused, if necessary, by rebending the pawl to a position such as shown in FIG. 7, wherein the pawl 17 intrudes into the passage 15 in proximate relation to the barb 28.

It will be readily recognized from the above description that there is provided in accordance with the invention a clamping or banding device which is inexpensive, being manufactured from stamped metallic parts which are readily assembled. The device may be readily applied for use as a bundling apparatus or as a hose clamp or in like applications, and importantly, may be readily removed for reuse. The device exhibits a low profile in contrast to polymeric and screw-type clamping mechanisms and is thus adapted for use in environments where close clearances must be observed.

As will be apparent to those skilled in the art and acquainted with the present disclosure, numerous variations in details of construction may be made without departing from the spirit of the invention. Accordingly, the same it to be broadly construed within the scope of the appended claims.

I claim:

1. A reusable metallic banding assembly comprising a band member and a clamp member, said band member comprising an elongate strap having parallel longitudinally extending side walls, a free end and a clamp end, a plurality of regularly longitudinally spaced locking components formed in said strap, said components including a tooth offset from the plane of said strap and a stop shoulder in the plane of said strap in longitudinally spaced relation to said tooth, said shoulders facing said free end of said strap, said clamp member being fixed to said clamp end of said strap and including upper and lower walls defining a passage parallel to the plane of said strap, a barb formed on said strap and extending into said passage, a pawl integrally formed on said clamp member, said pawl including a cam surface extending into said passage in proximate spaced relation to said barb, said pawl being positioned to be resiliently deflected away from said barb responsive to engagement of said teeth and cam surface when said strap is advanced through said passage in a first direction, said stop shoulders being biased by said pawl into the path of said barb to block relative movement of said strap in said passage in a direction opposite said first direction.

2. A banding assembly in accordance with claim 1, wherein said pawl is bodily shiftable outwardly of said passage, said pawl, in said outwardly shifted position, providing a clearance path through said passage for said shoulders relative to said barb whereby said strap is movable in said passage in a direction opposite said first direction.

3. A banding assembly in accordance with claim 2, wherein said pawl includes gripper means disposed outwardly of said passage for facilitating movement of said pawl outwardly of said passage.

4. A banding device in accordance with claim 1, wherein said strap includes a tang extending away from said passage and said clamp member includes an aperture, said tang extending through said aperture to thereby couple said clamp member to said strap member.

* * * * *